United States Patent
Ide

(10) Patent No.: US 10,124,434 B2
(45) Date of Patent: Nov. 13, 2018

(54) METHOD FOR CONTROLLING NECK DETECTION FOR WELDING POWER SUPPLY

(71) Applicant: DAIHEN Corporation, Osaka-shi, Osaka (JP)

(72) Inventor: Akihiro Ide, Osaka (JP)

(73) Assignee: DAIHEN Corporation, Osaka (JP)

( * ) Notice: Subject to any disclaimer, the term of this patent is extended or adjusted under 35 U.S.C. 154(b) by 1155 days.

(21) Appl. No.: 14/332,937

(22) Filed: Jul. 16, 2014

(65) Prior Publication Data
US 2015/0028009 A1    Jan. 29, 2015

(30) Foreign Application Priority Data
Jul. 23, 2013   (JP) .................. 2013-152412

(51) Int. Cl.
| | | |
|---|---|---|
| B23K 9/10 | (2006.01) | |
| B23K 9/06 | (2006.01) | |
| B23K 9/095 | (2006.01) | |
| B23K 9/09 | (2006.01) | |

(52) U.S. Cl.
CPC ............ B23K 9/0953 (2013.01); B23K 9/091 (2013.01); B23K 9/092 (2013.01); B23K 9/1075 (2013.01)

(58) Field of Classification Search
CPC ...... B23K 9/091; B23K 9/092; B23K 9/0953; B23K 9/1075; B23K 9/095; B23K 9/0956; B23K 9/1006; B23K 9/10; B23K 9/06; B23K 9/067; B23K 9/073
USPC ..... 219/124.02, 124.03, 124.1, 137.2, 130.1, 219/130.32, 121.11
See application file for complete search history.

(56) References Cited

U.S. PATENT DOCUMENTS

| | | | | |
|---|---|---|---|---|
| 5,130,514 A | * | 7/1992 | Kugai ................. | B23K 9/127 219/124.34 |
| 2005/0016975 A1 | * | 1/2005 | Reynolds ............. | B23K 9/1087 219/132 |
| 2010/0213181 A1 | * | 8/2010 | Hirota ................. | B23K 9/0671 219/130.31 |
| 2010/0230394 A1 | * | 9/2010 | Yokota ................ | B23K 9/0017 219/130.51 |

FOREIGN PATENT DOCUMENTS

| | | |
|---|---|---|
| JP | 2006-281219 | 10/2006 |
| JP | 2012-240101 | 12/2012 |

OTHER PUBLICATIONS

Japanese to English machine translation of JP 2012-240101.*

* cited by examiner

*Primary Examiner* — Michael G Hoang
(74) *Attorney, Agent, or Firm* — Hamre, Schumann, Mueller & Larson, P.C.

(57) ABSTRACT

A method is provided for controlling a neck detection for a welding power supply. The neck detection can be suitably performed even if the welding power supply is combined with another power supply for performing a simultaneous arc welding operation at a plurality of locations of a workpiece. The method includes using a control target welding power supply together with another power supply for performing arc welding concurrently at a plurality of locations of a common workpiece, detecting a neck in a molten portion of a welding wire which is brought into short-circuiting contact with the common workpiece, reducing the welding current for forming an arc, and automatically adjusting a neck detection value.

6 Claims, 6 Drawing Sheets

METHOD FOR CONTROLLING NECK DETECTION FOR WELDING POWER SUPPLY

BACKGROUND OF THE INVENTION

1. Field of the Invention

The present invention relates to a method for controlling a neck detection for a welding power supply or source. More particularly, the present invention relates to a method for controlling a neck detection for a welding power supply wherein the neck detection can be suitably performed even if the welding power supply is combined with another power supply for performing a simultaneous arc welding operation at a plurality of locations of a workpiece. The present invention also relates to a welding power supply system having such a control function.

2. Description of the Related Art

In consumable electrode arc welding, formation of an arc and short-circuiting occur alternately between a welding wire and a workpiece. As a phenomenon that occurs before the formation of an arc, a neck is formed in a molten portion of the welding wire before forming a molten droplet. In a conventional method for controlling the output from an arc welding power supply, the formation of a neck is detected based on a change in voltage or resistance between the welding wire and the workpiece. Upon detecting the formation of a neck, the welding current applied to the short-circuiting load is rapidly reduced, so that an arc is formed under application of a low current. According to this control (neck detection control), generation of spatter is suppressed, since only a low current is applied at the time of arc formation. This type of control is disclosed in e.g. JP-A-2006-281219 (which issued as Japanese Patent No. 4907892) and JP-A-2012-240101A.

Welding is sometimes performed simultaneously at a plurality of locations of a single workpiece by using a plurality of welding power supplies. However, the neck detection control disclosed in either of the two Japanese documents deals only with the case where consumable electrode arc welding is performed only at a single location with a single power supply. Therefore, the neck detection control disclosed in the two Japanese documents is not suitable where a plurality of power supplies (i.e., two welders) are used for performing consumable electrode arc welding simultaneously at a plurality of locations of a workpiece, since the state of one power supply may be affected by the state of another power supply operating at the same time.

SUMMARY OF THE INVENTION

The present invention is conceived under the circumstances described above. It is therefore an object of the present invention to provide a method for suitably controlling neck detection in a first power supply even if a second power supply is operated to pass a welding current simultaneously with the first power supply.

According to one aspect of the present invention, there is provided a method of controlling neck detection for a welding power supply as a control target. The method comprising: using the control target welding power supply together with another power supply for performing arc welding concurrently at a plurality of locations of a common workpiece, the control target welding power supply providing a welding current to a welder including a welding wire; detecting a neck in a molten portion of the welding wire which is brought into short-circuiting contact with the common workpiece based on a fact that a welding voltage applied by the control target welding power supply reaches a predetermined neck detection value; reducing the welding current for forming an arc; automatically adjusting the neck detection value based on a neck detecting time which is a period from the detection of the neck to the formation of the arc. The neck detection value is adjusted with a smaller gain when a welding current is concurrently supplied from said another welding power supply. Conversely, the neck detection value is adjusted with a larger gain when a welding current is not concurrently supplied from said another welding power supply.

According to an embodiment of the present invention, the smaller gain is set to zero (0) to prohibit the automatic adjustment of the neck detection value when a welding current is concurrently supplied from said another welding power supply.

Preferably, when a welding current is concurrently supplied from said another welding power supply only with respect to a part of an entire welding area of the common workpiece, the smaller gain is adopted for the entire welding area of the common workpiece.

According to another aspect of the present invention, there is provided a welding power supply system comprising: a first power supply for concurrent use with a second power supply for performing arc welding concurrently at a plurality of locations of a common workpiece, each of the first power supply and the second power supply providing a welding current to a welder including a welding wire; means for detecting a neck in a molten portion of the welding wire which is brought into short-circuiting contact with the common workpiece based on a fact that a welding voltage applied by the first welding power supply reaches a predetermined neck detection value; means for reducing the welding current for forming an arc; means for automatically adjusting the neck detection value based on a neck detecting time which is a period from the detection of the neck to the formation of the arc. The means for automatically adjusting adjusts the neck detection value with a smaller gain when a welding current is concurrently supplied from the second welding power supply, while adjusting the neck detection value with a larger gain when a welding current is not concurrently supplied from the second welding power supply.

Preferably, the system may further comprise means for determining whether a welding current is concurrently supplied from the second power supply.

Preferably, the means for determining comprises: a welding current sum detection circuit that detects a sum of the welding current from the first welding supply and the welding current from the second power supply, and a current flow determination circuit that calculates the welding current from the second power supply based on the sum and the welding current from the first power supply.

Other features of the present invention may be readily understood from the following detailed description given with reference to the accompanying drawings.

DETAILED DESCRIPTION

Preparatory Description

Figure 4:
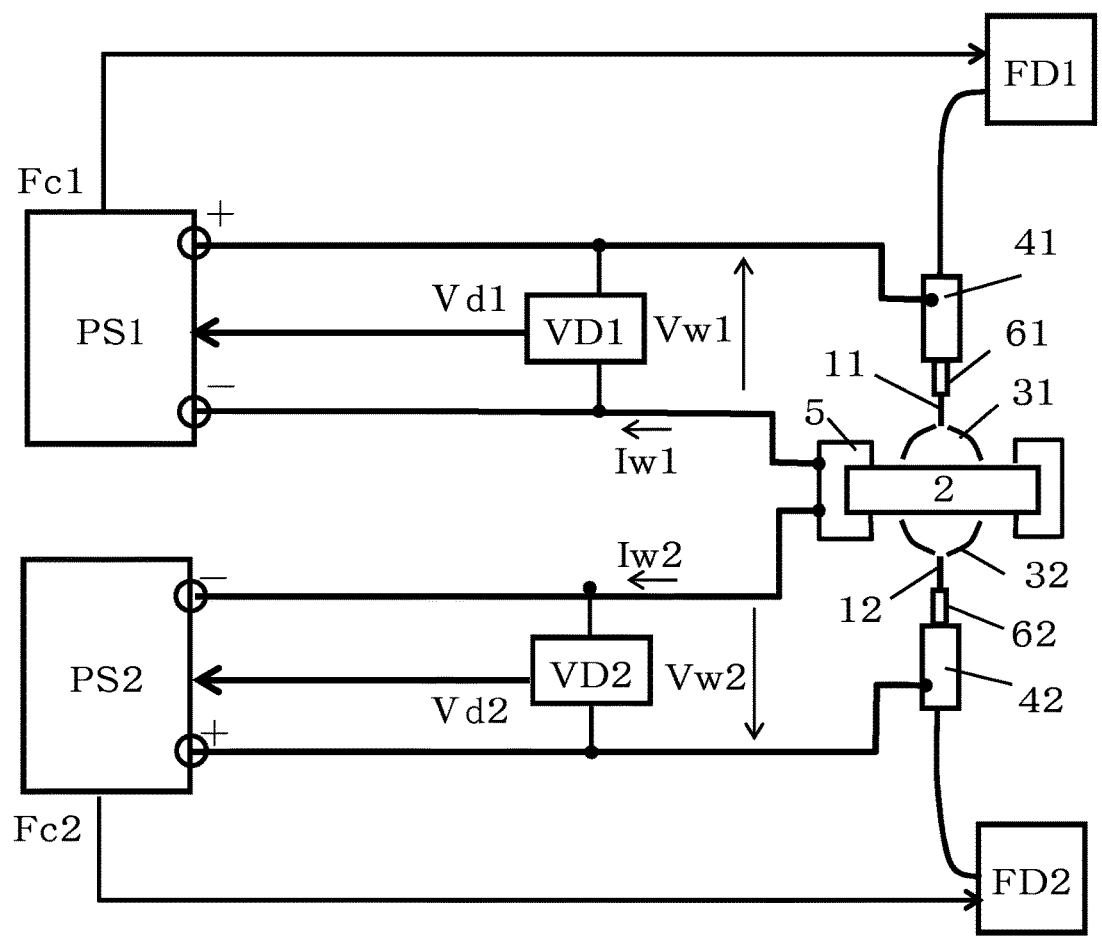
FIG. 4 schematically illustrates the structure of a welding apparatus for performing welding simultaneously at two locations in a single workpiece by using two welding power supplies.
Figure 5:
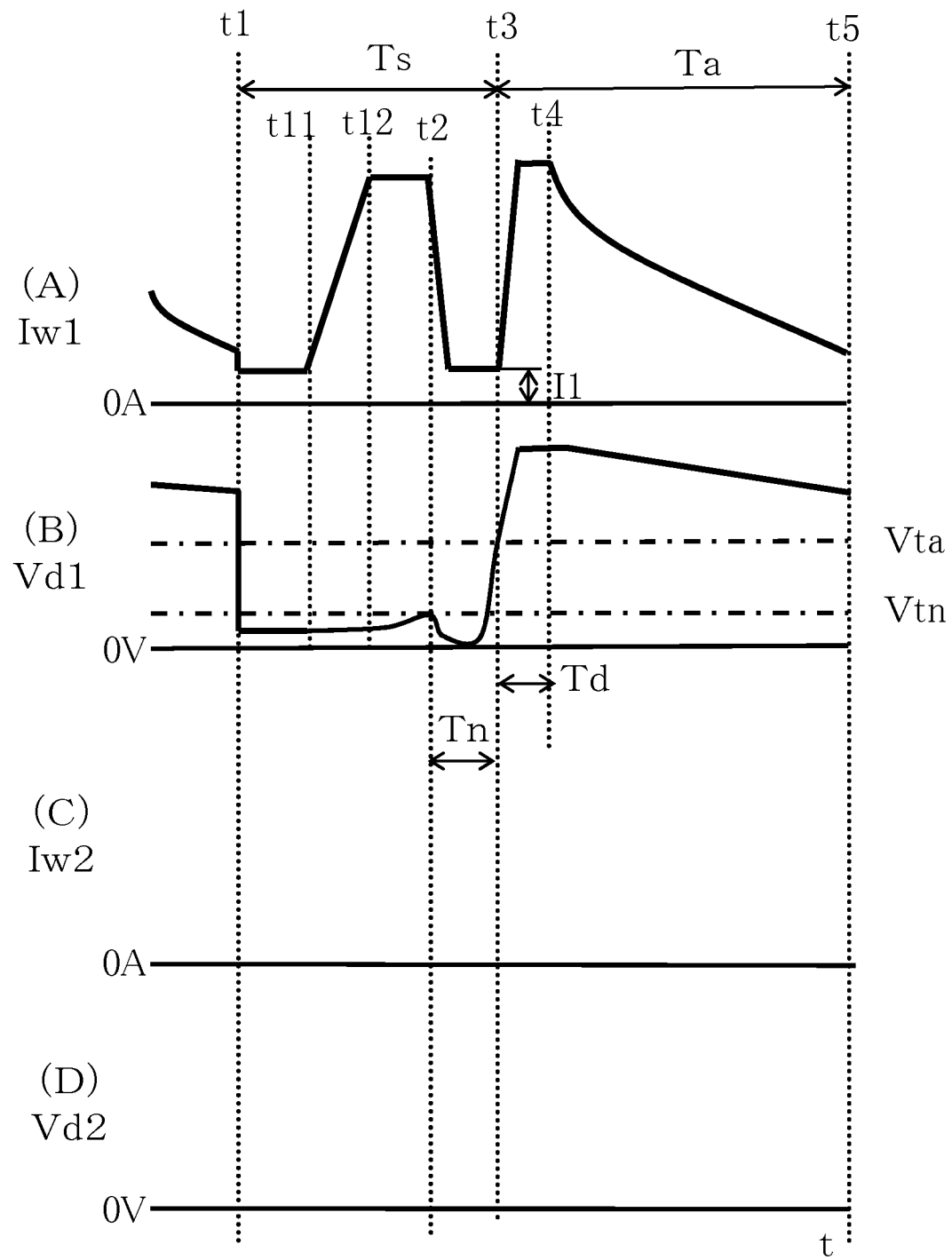
FIG. 5 shows waveforms when a welding current is applied only from one welding supply in the welding apparatus illustrated in FIG. 4.
Figure 6:
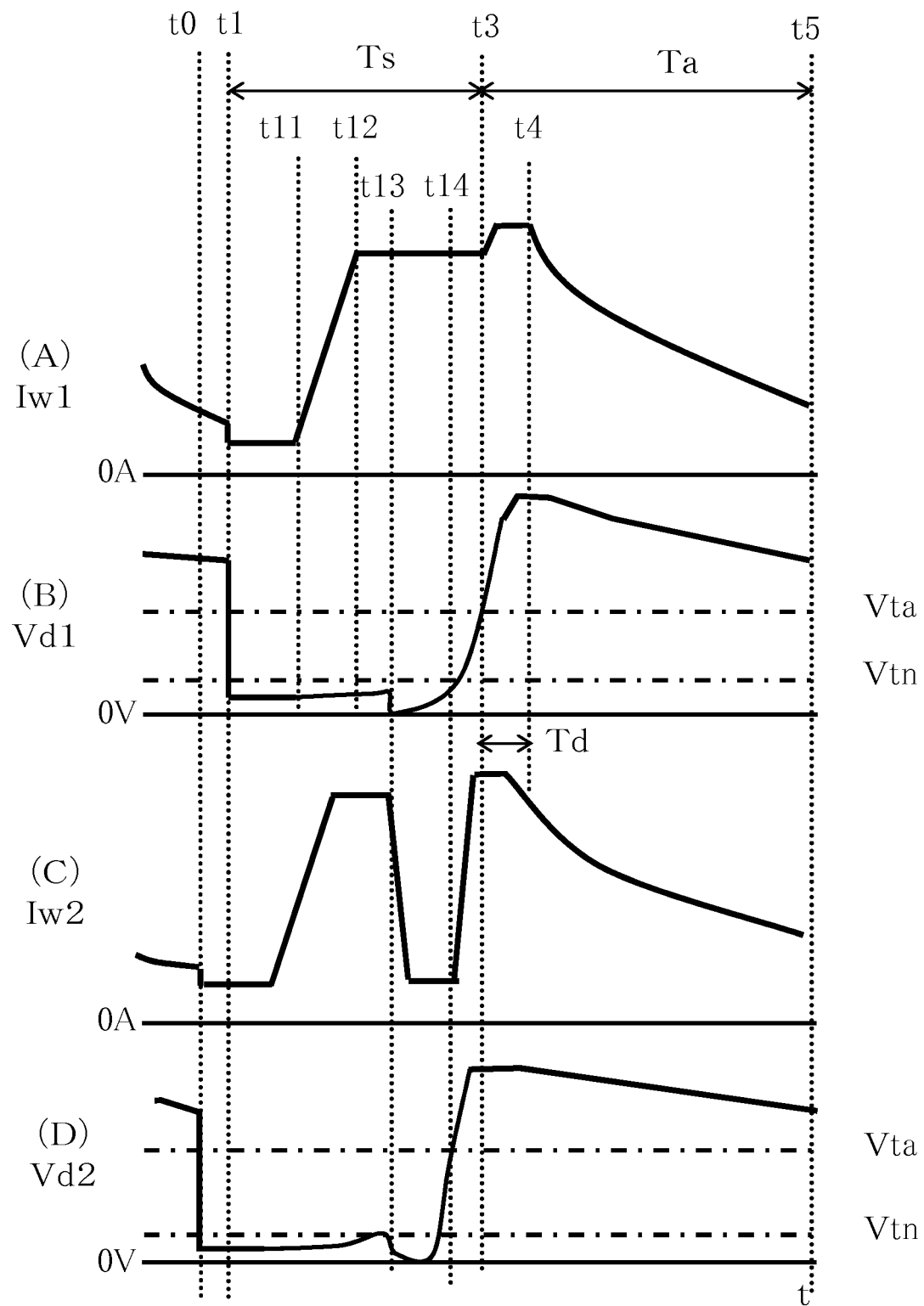
FIG. 6 shows waveforms when both of the two power supplies are activated for performing arc welding at a plurality of locations in the welding apparatus illustrated in FIG. 4.

Before describing preferred embodiments of the present invention, reference is made to FIGS. 4-6 for explaining the problems to be solved by the preferred embodiments of the present invention.

FIG. 4 schematically illustrates a welding apparatus that includes a first welding power supply PS1 and a second welding power supply PS2 for performing welding at two locations in a single workpiece 2. Each of the two welding power supplies PS1, PS2 has neck detection control function.

The first welding power supply PS1 outputs a first welding voltage Vw1 and a first welding current Iw1 while also outputting a first feed control signal Fc1 to a first feeder FD1. Taking the first feed control signal Fc1 as input, the first feeder FD1 feeds a first welding wire 11 through a first welding torch 41. A first arc 31 is generated between the first welding wire 11 and the workpiece 2. Short-circuiting and arc generation occur alternately between the first welding wire 11 and the workpiece 2, whereby welding is performed. The first welding torch 41 is held by a robot (not shown). The workpiece 2 may be placed on a jig 5.

The positive terminal of the first welding power supply PS1 is connected to a first power supply tip 61 of the first welding torch 41 via a cable. The negative terminal of the first welding power supply PS1 is connected to the jig 5 via a cable. A first welding voltage Vw1 is applied between the first power supply tip 61 and the surface of the workpiece 2. A voltage detection line is connected to the first power supply tip 61. Another voltage detection line is connected to the jig 5, because connection of the detection line to the surface of the workpiece 2 is difficult. Thus, the first welding voltage detection circuit VD1 detects the voltage between the first power supply tip 61 and the jig 5 for output of a first welding voltage detection signal Vd1. The first welding voltage detection signal Vd1 is inputted into the first welding power supply PS1. The first welding voltage detection signal Vd1 is used to detect the formation of a neck in a molten portion of the first welding wire 11 before formation of a molten droplet.

The second welding power supply PS2 outputs a second welding voltage Vw2 and a second welding current Iw2 while also outputting a second feed control signal Fc2 to the second feeder FD2. Taking the second feed control signal Fc2 as input, the second feeder FD2 feeds a second welding wire 12 through a second welding torch 42. A second arc 32 is generated between the second welding wire 12 and the workpiece 2. Short-circuiting and arc generation occur alternately between the second welding wire 12 and the workpiece 2, whereby welding is performed. The second welding torch 42 is held by a robot (not shown).

The positive terminal of the second welding power supply PS2 is connected to the second power supply tip 62 of the second welding torch 43 via a cable. The negative terminal of the second welding power supply PS2 is connected to the jig 5 via a cable. The second welding voltage Vw2 is applied between the second power supply tip 62 and the surface of the workpiece 2. A voltage detection line is connected to the second power supply tip 62. Another voltage detection line is connected to the jig 5, because connection of the detection line to the surface of the workpiece 2 is difficult. Thus, the second welding voltage detection circuit VD2 detects the voltage between the second power supply tip 62 and the jig 5 for output of a second welding voltage detection signal Vd2. The second welding voltage detection signal Vd2 is inputted into the second welding power supply PS2. The second welding voltage detection signal Vd2 is used to detect the formation of a neck in a molten portion of the second welding wire 12 before formation of a molten droplet.

The first welding current Iw1 flows from the positive terminal to the negative terminal of the first welding power supply PS1 through the first power supply tip 61, the first welding wire 11, the workpiece 2 and the jig 5 in the mentioned order. Similarly, the second welding current Iw2 flows from the positive terminal to the negative terminal of the second welding power supply PS2 through the second power supply tip 62, the second welding wire 12, the workpiece 2 and the jig 5 in the mentioned order. Thus, the first welding current Iw1 and the second welding current Iw2 can flow through the workpiece 2 and the jig 5. The sum of the first welding current Iw1 and the second welding current Iw2 is hereinafter referred to as "summed welding current" Ig. The current path in the workpiece 2 and the jig 5 through which the summed welding current Ig flows is hereinafter referred to as "common current path". The common current path has a resistance and an inductance L (µH). Generally, the resistance is negligibly small. Thus, the common current path can be considered to have only the inductance L.

The first welding voltage detection signal Vd1 and the second welding voltage detection signal Vd2 can be expressed by the equations below:

$$Vd1 = Vw1 + L \cdot dIg/dt \quad (1)$$

$$Vd2 = Vw2 + L \cdot dIg/dt \quad (2)$$

Thus, the first welding voltage detection signal Vd1 corresponds to the first welding voltage Vw1 on which the voltage generated by the inductance L of the common current path, which varies in accordance with a change in the summed welding current Ig, is superimposed. Similarly, the second welding voltage detection signal Vd2 corresponds to the second welding voltage Vw2 on which the voltage generated by the inductance L of the common current path is superimposed.

FIG. 5 represents the waveforms formed when a first welding current Iw1 is applied while a second welding current Iw2 is not applied in the above-described welding apparatus of FIG. 4. In FIG. 5, the waveform (A) indicates a first welding current Iw1, the waveform (B) indicates a first welding voltage detection signal Vd1, the waveform (C) indicates a second welding current Iw2 and the waveform (D) indicates a second welding voltage detection signal Vd2.

In the case illustrated in FIG. 5, welding is performed using only the first welding power supply PS1 with the second power supply PS2 interrupted. For this reason, a first welding current Iw1 is applied, but a second welding current Iw2 is absent. Thus, the second welding current Iw2 indicated by the waveform (C) remains 0 A, and the second welding voltage detection signal Vd2 indicated by the waveform (D) remains also 0V. In this case, the neck detection control operates properly without any error, as explained below.

(1) Operation from t1 to t2:

When the first welding wire 11 comes into contact with the workpiece 2 at time t1, short-circuiting occurs. As a result, as indicated by the waveform (B), the first welding voltage detection signal Vd1 drops rapidly to a short-circuiting voltage of several volts.

As indicated by the waveform (A), the first welding current Iw1, which has gradually dropped toward the end of an arc period Ta, drops at time point t1 to a predetermined initial value. During an initial period between time point t1 and time point t11, the first welding current Iw1 is maintained at the initial value. Then, during the period between time point t11 and time point t12, the first welding current Iw1 continues to rise with a gradient that is predetermined for short-circuiting. After reaching a predetermined peak value at time point t12, the first welding current Iw1 is maintained at the peak value until time point t2.

As indicated by the waveform (B), the first welding voltage detection signal Vd1 starts to rise at around time point t12 when the first welding current Iw1 reaches the peak value. This is because a neck gradually grows in the molten portion of the first welding wire 11. Monitoring of the growing neck starts from time point t12. While this neck monitoring is performed, the first welding current Iw1 is substantially maintained at the peak value, as indicated by the waveform (A).

On the other hand, as indicated by the waveform (C), the second welding current Iw2 is 0 A. Applying this to the equation (1), $L \cdot dIg/dt$ is nearly 0 which is negligible, and Vd1=Vw1 holds. Thus, the formation of a neck in a molten wire portion is properly detected without any failure. The initial period between time point t1 and the time 11 may be set to about 1 ms for example, the initial current may be set to about 50 A for example, the short-circuiting-time slope may be set to about 100 to 300 A/ms for example and the peak value may be set to about 300 to 400 A for example.

(2) Operation from t2 to t3:

At time point t2, when the first welding voltage detection signal Vd1 increases rapidly to a predetermined neck detection value Vtn as indicated by the waveform (B), it is determined that a neck in the molten wire portion has grown to a sufficient degree for subsequent arc recurrence. When the neck is detected in this way, the first welding current Iw1 reduces rapidly from the peak value to a predetermined low-level current value I1 and is maintained at the low-level current value I1 until an arc is formed at time point t3, as indicated by the waveform (A). In this process, the current is reduced at a very high rate of about 3000 A/ms for example, whereas the low-level current value I1 is set to about 30 A for example. As indicated by the waveform (B), the first welding voltage detection signal Vd1 once drops because the first welding current Iw1 drops to the low-level current value I1, and then the first welding voltage detection signal Vd1 rapidly increases. The period from time point t2 (at which the neck is detected) to time point t3 (at which arc is formed) is hereinafter referred to as "neck detecting time Tn", and the period from time point t1 to time point t3 may be referred to as "short-circuiting period Ts".

(3) Operation from t3 to t4:

When an arc is formed at time point t3 as indicated by the waveform (B), the first welding voltage detection signal Vd1 increases to a value not less than a short-circuit/arc distinction value Vta. As indicated by the waveform (A), the first welding current Iw1 increases from time point t3 with a predetermined gradient. After reaching a predetermined high-level, the first welding current Iw1 is maintained at this high-level until time point t4. As indicated by the waveform (B), the first welding voltage detection signal Vd1 remains higher than short-circuit/arc distinction value Vta during a period between time point t3 and time point t4, which period is hereinafter referred to as "delay period Td". The delay period Td is set to about 2 ms for example.

(4) Operation from t4 to t5:

As indicated by the waveform (A), the first welding current Iw1 reduces gradually from the high-level in the period from time point t4 to time point t5. At time point t5, the welding wire 11 comes into short-circuiting contact with the workpiece 2 again. Similarly, as indicated by the waveform (B), the first welding voltage detection signal Vd1 drops gradually from the high-level voltage value in the period from time point t4 to time point t5. The period from time point t3 to time point t5 including the delay period Td may be referred to as "arc period Ta".

As described above, when a welding current (second welding current Iw2) from another welding power supply is not applied, the growth of a neck can be detected accurately, because the voltage generated due to the inductance L of the common current path is negligibly small.

In the above-described neck detection control, the state of a growing neck needs to be detected precisely for suppressing spatter generation. The state of a growing neck varies depending on the welding conditions such as the kind of the shield gas, the kind of the welding wire, the shape of the workpiece, the feed rate of the welding wire and the welding posture. Thus, the sensitivity for detecting a growing neck needs to be set properly in view of the welding conditions. The neck detection sensitivity can be adjusted by changing the neck detection value Vtn. That is, the sensitivity becomes lower when the neck detection value Vtn is increased, whereas the sensitivity becomes higher when the neck detection value Vtn is decreased. When the sensitivity is too low because of an excessively high neck detection value Vtn, the neck detecting time Tn becomes too short, so that the welding current cannot be sufficiently reduced before an arc is formed. In this case, spatter generation cannot be effectively reduced. When the sensitivity is too high because of an excessively low neck detection value Vtn, the neck detecting time Tn becomes too long and it takes much time before an arc is formed. In this case, the welding state becomes unstable. A neck detection value Vtn is considered to be desirable when the neck detecting time Tn lies in the range of about 50 to 1000 μs for example.

In the welding power supply provided with the above-described neck detection control, the neck detection value Vtn is set in advance based on a shield gas selection signal, a welding wire selection signal and a feed rate setting signal. In the actual welding process, however, the proper neck detection value varies depending on combinations of the above-described welding conditions. Thus, the welding apparatus needs to have a function of automatically controlling the neck detection value Vtn to a proper value during the welding process.

FIG. 6 illustrates the waveforms exhibited by the welding apparatus of FIG. 4 when both of a first welding current Iw1 and a second welding current Iw2 are applied. In FIG. 6, the waveform (A) indicates a first welding current Iw1, the waveform (B) indicates a first welding voltage detection signal Vd1, the waveform (C) indicates a second welding current Iw2, and the waveform (D) indicates a second welding voltage detection signal Vd2. As shown in FIG. 6, both of the first welding power supply PS1 and the second welding power supply PS2 are active to supply a first welding current Iw1 and a second welding current Iw2, respectively. In the example shown in FIG. 6, the period in which the first welding wire 11 and the workpiece 2 are short-circuited (between time point t1 and time point t3) partially overlaps the period in which the second welding wire 12 and the workpiece 2 are short-circuited (between time point t0 and time point t14). In this example, the neck detection control does not operate properly for the reasons described below. Since FIG. 6 corresponds generally to FIG. 5, description is omitted with respect to the same operations as already described with reference to FIG. 5.

In the period between time point t1 and time point t3, the first welding wire 11 and the workpiece 2 are short-circuited, and the second welding wire 12 and the workpiece 2 are also short-circuited. Thus, as indicated by the waveform (C), the second welding current Iw2 changes rapidly up and down.

(1) Operation from t0 to t13

When the second welding wire 12 comes into short-circuiting contact with the workpiece 2 at time point t0, the second welding voltage detection signal Vd2 drops rapidly to a short-circuiting voltage of several volts, as indicated by the waveform (D). As indicated by the waveform (C), the second welding current Iw1, which has gradually dropped toward the end of an arc period Ta, drops to a predetermined initial value at time point t0. The second welding current Iw2 is maintained at the initial value during an initial period and then increases to a peak value with a predetermined steep gradient. As indicated by the waveform (D), the second welding voltage detection signal Vd2 then increases from the short-circuiting voltage to a neck detection value Vtn at time point t13, whereby a neck is detected. As indicated by the waveform (C), when the neck is detected, the second welding current Iw2 drops rapidly from the peak value to a low level.

Meanwhile, when the first welding wire 11 comes into short-circuiting contact with the workpiece 2 at time point t1, the first welding voltage detection signal Vd1 drops rapidly to a short-circuiting voltage of several volts, as indicated by the waveform (B). As indicated by the waveform (A), the first welding current Iw1, which has gradually dropped toward the end of an arc period Ta, drops to a predetermined initial value at time point t1. The first welding current Iw1 is maintained at the initial current value during the initial period between time point t1 and time point t11. During the period between time point t11 and time point t12, the first welding current Iw1 continues to increase with a gradient that is predetermined for short-circuiting. After reaching a first peak value at time point t12, the first welding current Iw1 is maintained at the first peak value. As indicated by the waveform (B), the first welding voltage detection signal Vd1 starts to rise at around time point t12 when the first welding current Iw1 reaches the first peak value. This is because a neck grows gradually in the molten portion of the first welding wire 11. From time point t12, the growing neck is continuously monitored. While the growing neck is monitored, the first welding current Iw1 is substantially maintained at the first peak value, as indicated by the waveform (A) indicates.

On the other hand, as indicated by the waveform (C), the second welding current Iw2 drops sharply because a neck is detected at time point t13. Thus, L·dIg/dt in Equation (1) above may be given by L·Ig/dt=L·(dIw1/dt+dIw2/dt). In the example illustrated in FIG. 6, dIw1/dt is a small value at time point t13, whereas dIw2/dt is a large negative value at time point t13. Thus, as indicated by the waveform (B), although the first welding voltage detection signal Vd1 starts to rise at time point t12 upon formation of a neck, it drops at time point t13 without reaching the neck detection value Vtn due a rapid reduction of the second welding current Iw2. Thus, the growth of the neck cannot be detected.

(2) Operation from t13 to t3

Since the first welding voltage detection signal Vd1 drops at time point t13 and does not reach the neck detection value Vtn as indicated by the waveform (B), the first welding current Iw1 is maintained at the peak value until a first arc 31 is formed at time point t3. On the other hand, since a second arc 32 is formed at time point t14 before time point t3, the second welding voltage detection signal Vd2 increases to the arc voltage, as indicated by the waveform (D). As indicated by the waveform (C), the second welding current Iw2 rises with a steep gradient from the low level at time point t14 to a high level. The neck detecting time Tn in the first welding power supply PS1 is 0, because the neck is not detected.

(3) Operation t3 to t4:

When a first arc 31 is formed at time point t3 as indicated by the waveform (B), the first welding voltage detection signal Vd1 exceeds a short-circuit/arc distinction value Vta. As indicated by the waveform (A), the first welding current Iw1 continues to increase with a predetermined gradient from the first peak value at time point t3. The first welding current Iw1 rises to an even higher second peak value and is maintained at the second higher peak value until time point t4. As indicated by the waveform (B), the first welding voltage detection signal Vd1 is maintained at the higher peak value during a delay period Td between time point t3 and time point t4.

(4) Operation t4 to t5:

As indicated by the waveform (A), the first welding current Iw1 reduces gradually from the second peak value starting from time point t4. Similarly, as indicated by the waveform (B), the first welding voltage detection signal Vd1 drops gradually from the high level.

As described above, when the short-circuiting periods overlap each other, the possibility of neck detection failure is high, because a large voltage is generated due to the inductance L of the common current path.

In the example described above, a neck detection failure occurs because the second welding current Iw2 drops rapidly when detecting a neck of the first welding wire 11. A neck detection failure can occur also when the current increases with a steep gradient. Moreover, a neck detection failure can occur when an arc length changes rapidly due to e.g. gas discharge from a molten pool during an arc period and hence the second welding current Iw2 changes rapidly. Thus, a neck detection failure due to application of a welding current from another welding power supply can occur not only when the neck detecting time Tn becomes shorter or longer than a proper length.

Description of Preferred Embodiment

A preferred embodiment of the present invention, which is intended to eliminate or reduce the problems described above with reference to FIGS. 4-6 is described below with reference to FIGS. 1-3 of the accompanying drawings.

Figure 1:
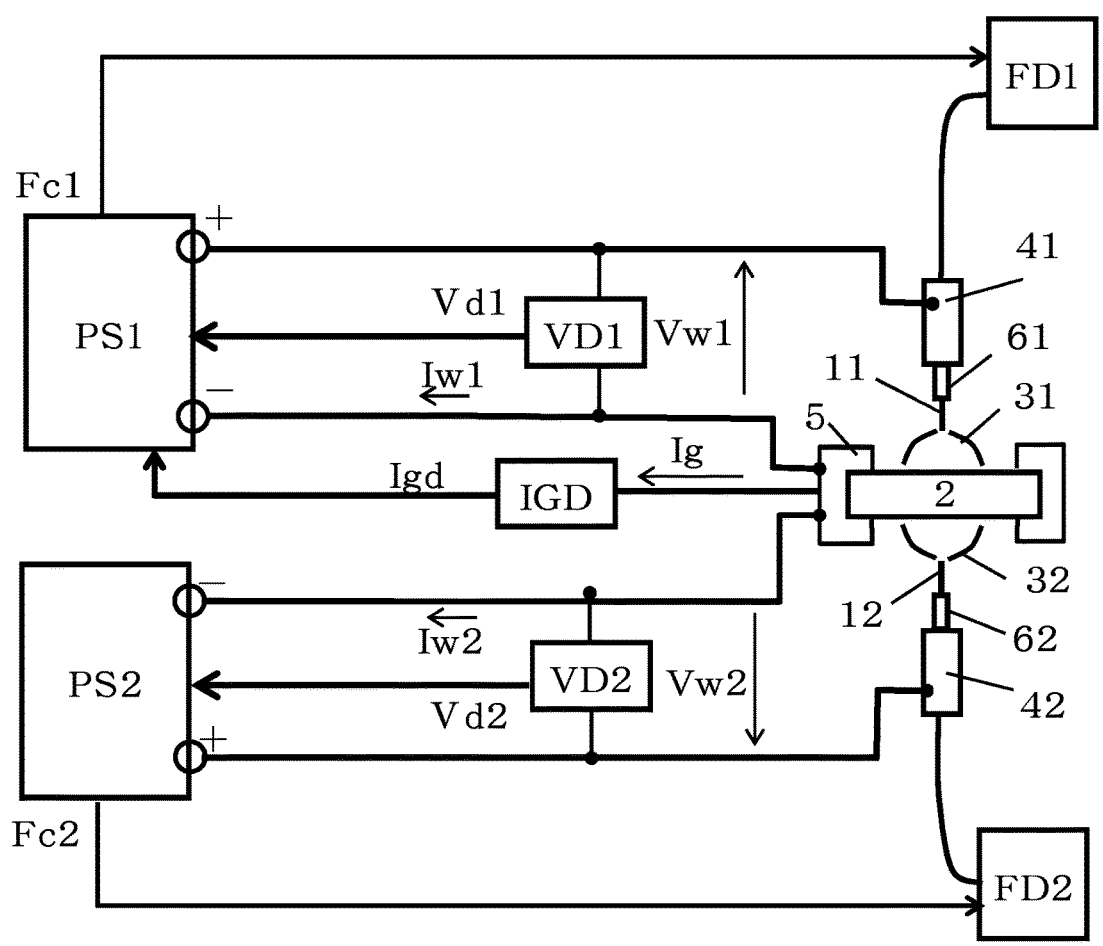
FIG. 1 schematically illustrates the structure of a welding apparatus for performing welding simultaneously at two locations in a single workpiece by using two welding power supplies according to an embodiment of the present invention.

FIG. 1 schematically illustrates the structure of a welding apparatus for performing welding simultaneously at two different locations in a single workpiece by using two welding power supplies, according to an embodiment of the present invention. The elements of the welding apparatus that correspond to those illustrated in FIG. 4 are designated by the same reference signs as those used in FIG. 4, and description of these elements may be omitted where appropriate. To simplify the explanation, an illustrative example of the present invention is applied only to the first welding power supply PS1. The second welding power supply PS2 may be controlled in the same way as the second power supply PS2 shown in FIG. 4 (see also the waveforms (C) and (D) in FIG. 6). The difference between the welding apparatus of FIG. 1 and that of FIG. 4 is the addition of a welding current sum detection circuit IGD.

The welding current sum detection circuit IGD detects the sum Ig of the first and second welding currents Iw1, Iw2 flowing through the common current path and outputs a welding current sum detection signal Igd. The welding current sum detection signal Igd is inputted into the first welding power supply PS1.

Figure 2:
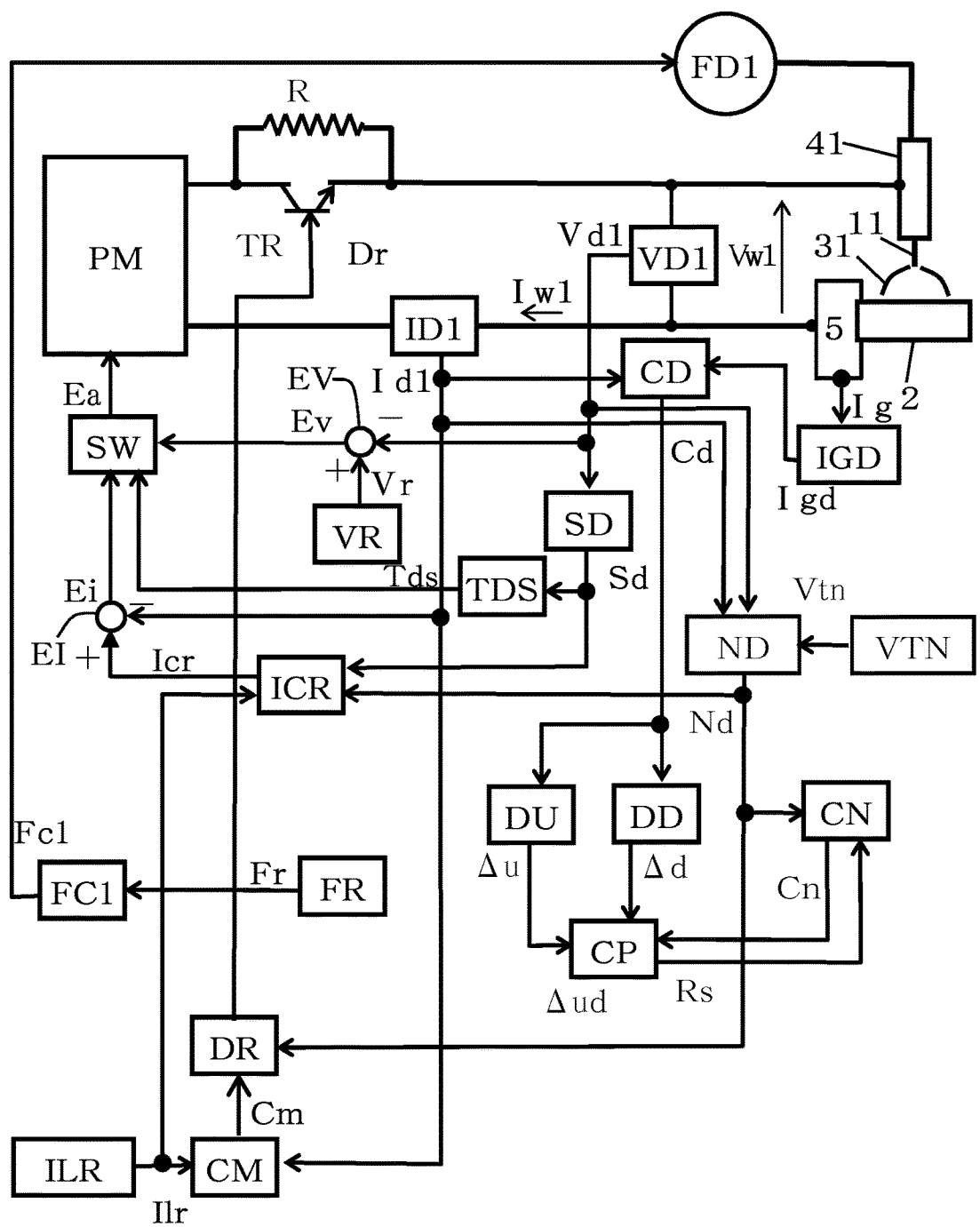
FIG. 2 is a block diagram showing a first welding power supply PS1 of the welding apparatus illustrated in FIG. 1.

FIG. 2 is a block diagram of the first welding power supply PS1 of the welding apparatus of FIG. 1. Each block is explained below with reference to FIG. 2.

A power supply main circuit PM receives power such as three-phase 200 V from a commercial power supply (not shown) and performs output control such as inverter control based on an error amplification signal Ea described later to output a first welding voltage Vw1 and a first welding current Iw1. Though not illustrated, the power supply main circuit PM includes a primary rectifier for rectifying the commercial power supply, a smoothing capacitor for smoothing the direct current obtained by the rectification, an inverter circuit for converting the smoothed direct current into a high-frequency alternating current, a high-frequency transformer for dropping the high-frequency alternating current to a voltage suitable for welding, a secondary rectifier for rectifying the dropped high-frequency alternating current, a reactor for smoothing the rectified direct current, a modulation circuit for performing pulse width modulation control by taking the error amplification signal Ea as input, and an inverter drive circuit for driving a switching element of the inverter circuit by taking a pulse width modulation control signal as input.

A current reducing resistor R is disposed between the power supply main circuit PM and the first welding torch 41. The resistance of the current reducing resistor R is set to be ten or more times larger than a short-circuiting load (about 0.01 to 0.03Ω) and may be 0.5 to 3Ω. Thus, when the current reducing resistor R is interposed in the current path for neck detection control, the energy stored in a DC reactor in the welding power supply and in a reactor of an external cable discharged rapidly. A transistor TR is connected in parallel with the current reducing resistor R and turned on and off in accordance with a drive signal Dr described later.

A first welding wire 11 is fed through a first welding torch 41 by a first feeder FD1 to generate a first arc 31 between itself and a workpiece 2. The workpiece 2 is placed on a jig 5. A first welding voltage Vw1 is applied between a first power supply tip (not shown) in the first welding torch 41 and the surface of the workpiece 2 so that the first welding current Iw1 flows. The summed welding current Ig flows through the common current path provided by the workpiece 2, the jig 5 and so on.

A first welding current detection circuit ID1 detects the first welding current Iw1 and outputs a first welding current detection signal Id1. As described with reference to FIG. 1, the welding current sum detection circuit IGD, which is provided externally of the first power supply PS1, detects a summed welding current Ig for output of a welding current sum detection signal Igd. As described with reference to FIG. 1, the first welding voltage detection circuit VD1, which is provided externally of the first power supply PS1 in the illustrated embodiment, detects the voltage between the first power supply tip in the first welding torch 41 and the jig 5 for output of a first welding voltage detection signal Vd1. The first welding voltage detection circuit VD1 may be provided internally of the first power supply PS1.

The first welding voltage detection signal Vd1 is inputted into a short-circuit determination circuit SD. When the first welding voltage detection signal Vd1 is lower than a predetermined short-circuit/arc distinction value Vta (see FIG. 3), the short-circuit determination circuit SD detects a short-circuiting state and outputs a short-circuit determination signal Sd of a high level. When the first welding voltage detection signal Vd1 is higher than the predetermined short-circuit/arc distinction value Vta, the short-circuit determination circuit Sd detects an arc formation state and outputs a short-circuit determination signal Sd of a low level.

Taking the welding current sum detection signal Igd and the first welding current detection signal Id1 as input, a current flow determination circuit CD calculates Igd-Id1. When the value of Igd-Id1 is equal to or higher than a predetermined threshold, the current flow determination circuit CD outputs a current flow determination signal Cd of a high level. When the value Igd-Id1 is lower than the predetermined threshold, the current flow determination circuit CD outputs a current flow determination signal Cd of a low level. The threshold may be set to about 10 A for example. The value Igd-Id1 corresponds to the value of the welding current from the second welding power supply PS2, as seen from the first welding power supply PS1. Thus, when the current flow determination signal Cd of a high level is outputted, it means that a welding current is being supplied from the second welding power supply PS2. When the current flow determination signal Cd of a low level is outputted, it means that a welding current is not being supplied from the second welding power supply PS2. In the example illustrated in FIG. 1, the welding current from the second welding power supply PS2 is the second welding current Iw2.

Taking a neck detection signal Nd and a reset signal Rs described later as input, a counter circuit CN measures the neck detecting time Tn in which the neck detection signal Nd remains at a high level. When the neck detecting time Tn is shorter than a predetermined lower limit Lt, the counter circuit CN reduces the counter value by 1 for output of a corresponding counter value signal Cn. When the neck detecting time Tn is longer than a predetermined upper limit Ht, the counter circuit CN increases the counter value by 1 for output of a corresponding counter value signal Cn. When a reset signal Rs is inputted, the counter circuit CN resets the counter value to 0. The counter value signal Cn is a counter value. At the start of the welding, the counter value is set to the initial value 0. The upper limit and the lower limit are set to appropriate values in view of the welding conditions. The appropriate values may be found through experiments. For instance, the lower limit Lt may be set to e.g. 0 to 200 μs and the upper limit Ht may be set to e.g. 500 to 1500 μs.

Taking the current flow determination signal Cd as input, a decrement setting circuit DD outputs a decrement signal Δd. Specifically, when the current flow determination signal Cd is at a low level, the decrement setting circuit DD outputs a decrement signal Δd of a higher decrement value. When the current flow determination signal Cd is at a high level, the decrement setting circuit DD outputs a decrement signal Δd of a lower decrement value. Both of the higher decrement value and the lower decrement value are negative values. The absolute value of the higher decrement value is larger than that of the lower decrement value. For instance, the absolute value of the higher decrement value is set to about 10 to 30% of the initial neck detection value Vtn0 to be described later. The absolute value of the lower decrement value is set to about 30 to 70% of the higher decrement value. The value of the decrement signal Δd determines the gain in automatically controlling the neck detection value Vtn. When a welding current is not applied from the second welding power supply PS2 (i.e., when the current flow determination signal Cd is at a low level), the decrement signal Δd of a higher decrement value is outputted so that the gain becomes large. When a welding current is applied from the second welding power supply PS2 (i.e., when the current flow determination signal Cd is at a high level), the decrement signal Δd of a low decrement value is outputted so that the gain becomes small.

Taking the current flow determination signal Cd as input, an increment setting circuit DU outputs an increment signal Δu. Specifically, when the current flow determination signal Cd is at a low level, the increment setting circuit DU outputs an increment signal Δu of a higher increment value. When the current flow determination signal Cd is at a high level, the increment setting circuit DU outputs an increment signal Δd of a lower increment value. Both of the higher increment value and the lower increment value are positive values. The absolute value of the higher increment value is larger than that of the lower increment value. For instance, the absolute value of the higher increment value is set to about 10 to 30% of the initial neck detection value Vtn0 to be described later. The absolute value of the lower increment value is set to about 30 to 70% of the higher increment value. The value of the increment signal Δu determines the gain in automatically controlling the neck detection value Vtn. When a welding current is not applied from the second welding power supply PS2 (i.e., when the current flow determination signal Cd is at a low level), the increment signal Δu of a higher increment value is outputted so that the gain becomes large. When a welding current is applied from the second welding power supply PS2 (i.e., when the current flow determination signal Cd is at a high level), the increment signal Δu of a lower increment value is outputted so that the gain becomes small.

Taking the decrement signal Δd, the increment signal Δu and the counter value signal Cn as input, the counter value judging circuit CP outputs a correction signal Δud along with a reset signal Rs. Specifically, when the counter value signal Cn drops to or below a predetermined minus reference value Lc, the counter value judging circuit CP outputs a decrement signal Δd as the correction signal Δud and also outputs a reset signal Rs. When the counter value signal Cn rises to or above a predetermined plus reference value, the counter value judging circuit CP outputs an increment signal Δu as the correction signal Δud and also outputs a reset signal Rs. The minus reference value Lc is a negative value in a range of about e.g. −5 to −20 for example. The plus reference value Hc is a positive value in a rage of about e.g. +5 to +20 for example. These reference values may be set to appropriate values in view of the fluctuations of the neck formation state, based on experiments. The absolute value of the minus reference value Lc and the absolute value of the plus reference value Hc do not necessarily need to be equal to each other. Each of the absolute values of the minus reference value Lc and the plus reference value Hc may be switched between a larger value and a smaller value in accordance with the current flow determination signal Cd. The minus reference value Lc and the plus reference value Hc determine the gain in automatically controlling the neck detection value.

Taking the correction signal Δud as input, a neck detection value setting circuit VTN performs correction based on the correction signal Δud and outputs a neck detection value signal Vtn. Herein, Vtn=Vtn0+ΣΔud, where Vtn0 is an initial value. The adding of Δud is performed every time the correction signal Δud is inputted.

The automatic control of the neck detection value signal Vtn by the above-described circuit can be summarized as follows:
1) The neck detecting time Tn is measured at each time of short-circuiting.
2) When Tn≤Lt, Cn−1 is performed. When Lt<Tn<Ht, Cn+0 is performed. When Tn≥Ht, Cn+1 is performed. Herein, Lt is the lower limit, Ht is the upper limit, Cn is a counter value. The counter value Cn is reset to 0 every time the welding starts.
3) When Cn≤Lc, the correction signal Δud=Δd is outputted and Cn is reset to 0. When Cn≥Hc, the correction signal Δud=Δu is outputted and Cn is reset to 0. Here, Lc is the minus reference value, Hc is the plus reference value, Δd is the decrement value and Δu is the increment value.
4) The neck detection value is automatically controlled by computing Vtn=Vtn0+ΣΔud. Here, the Vtn0 is the initial value.
5) The above process steps 1) through 4) are repeated during the welding process.

Taking the neck detection value signal Vtn, the first welding voltage detection signal Vd1 and the first welding current detection signal Id1 as input, the neck detection circuit ND outputs a neck detection signal Nd. Specifically, when the increase of the first welding voltage detection signal Vd1 in the short-circuiting period reaches the neck detection value Vtn, the neck detection circuit ND determines that a neck has grown to a predetermined degree and outputs a neck detection signal Nd of a high level. However, the neck detection signal Nd from the neck detection circuit ND shifts to a low level when an arc is formed and the first welding voltage detection signal Vd1 exceeds a short-circuit/arc distinction value Vta (see FIG. 3). Alternatively, a neck detection signal Nd of a high level may be generated when the differential value of the first welding voltage detection signal Vd1 in the short-circuit period reaches a correspondingly modified neck detection value signal. Further alternatively, the value of the first welding voltage detection signal Vd1 may be divided by the value of the first welding current detection signal Id1 to compute the resistance of the molten wire portion, and a neck detection signal Nd of a high level may be generated when the differential value of the resistance has reached a correspondingly modified neck detection value signal.

A low-level current setting circuit ILR outputs a predetermined low-level current setting signal Ilr. Taking the low-level current setting signal Ilr and the first welding current detection signal Id1 as input, a current comparison circuit CM outputs a current comparison signal Cm. Specifically, when Id1<Ilr, the current comparison circuit CM outputs a current comparison signal Cm of a high level. When Id1≥Ilr, the current comparison circuit CM outputs a current comparison signal Cm of a low level. Taking the current comparison signal Cm and the neck detection signal Nd as input, the drive circuit DR outputs a drive signal Dr to a base terminal of the transistor TR. The drive signal Dr changes to a low level when the neck detection signal Nd changes to a high level. The drive signal Dr then changes to a high level when the current comparison signal Cm changes to a high level. Thus, when a neck is detected, the drive signal Dr takes a low level so that the transistor TR is turned off and the current reducing resistor R interposed in the current path becomes effective. As a result, the first welding current Iw1 flowing through the short-circuiting load reduces rapidly. When the first welding current Iw1 drops to the value of the low-level current setting signal Ilr, the drive signal Dr changes to a high level, so that the transistor TR is turned on. Thus, the current reducing resistor R is short-circuited or circumvented, and the circuit returns to the normal state.

Taking the short-circuit determination signal Sd, the low-level current setting signal Ilr and the neck detection signal Nd as input, a current control circuit ICR performs the following process for output of a current control signal Icr.

1) During a predetermined initial period from the time when the short-circuit determination signal Sd changes to a high level (short-circuiting), the current control circuit ICR outputs a current control signal Icr of a predetermined initial current value.
2) Thereafter, the current control circuit ICR increases the value of the current control signal Icr from the initial current value to a predetermined peak value with a predetermined gradient that is selected for the short-circuiting period and then maintains the peak value.
3) When the neck detection signal Nd changes to a high level (neck detection), the current control circuit ICR changes the value of the current control signal Icr to the value of the low-level current setting signal Ilr and maintains this value.
4) When the short-circuit determination signal Sd changes to a low level (arc), the current control circuit ICR increases the current control signal Icr to a predetermined high-level current setting value with a predetermined gradient that is selected for the arc period and then maintains the high-level current setting value.

Taking the short-circuit determination signal Sd as input, an OFF delay circuit TDS outputs a delay signal Tds that determines the timing at which the short-circuit determination signal Sd changes from a high level to a low level, with a delay of a predetermined time. Therefore, the delay signal Tds remains at a high level during the short-circuiting period and changes to a low level after the passage of a predetermined time from the formation of an arc.

A voltage setting circuit VR outputs a predetermined voltage setting signal Vr for setting the welding voltage during the arc period.

A current error amplification circuit EI amplifies the error between the current control signal Icr (+) and the first welding current detection signal Id1 (−) to output a current error amplification signal Ei.

A voltage error amplification circuit EV amplifies the error between the voltage setting signal Vr (+) and the first welding voltage detection signal Vd1 (−) to output a voltage error amplification signal Ev.

Taking the current error amplification signal Ei, the voltage error amplification signal Ev and the delay signal Tds as input, a control switching circuit SW outputs an error amplification signal Ea. The current error amplification signal Ei is outputted as the error amplification signal Ea while the delay signal Tds remains at a high level (from the start of short-circuiting up to the lapse of the delay time from the arc formation). The voltage error amplification signal Ev is outputted as the error amplification signal Ea when the delay signal Tds held at a low level (arc).

A feed rate setting circuit FR outputs a predetermined feed rate setting signal Fr. Taking the feed rate setting signal Fr as input, the first feed control circuit FC1 outputs a first feed control signal Fc1 to the first feeder FD1 for feeding the first welding wire 11 at a feed rate corresponding to the feed rate setting signal.

Figure 3:
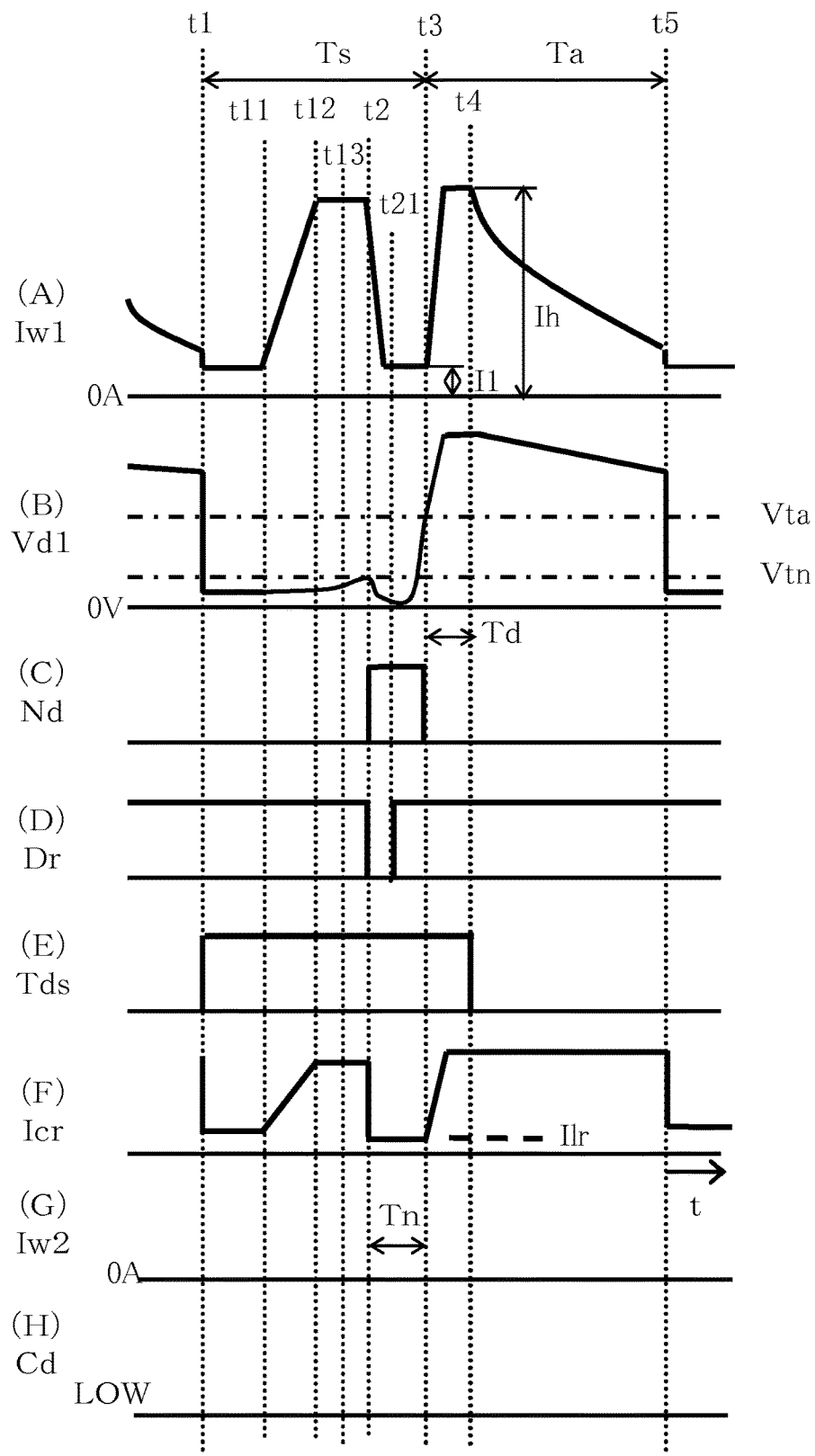
FIG. 3 is a timing diagram of signals in the first welding power supply PS1 of FIGS. 1 and 2 when a welding current from another welding power supply is not applied.

FIG. 3 is a timing diagram of signals in the first welding power supply PS1 of FIG. 2 when a welding current from the second welding power supply PS2 is not applied. The waveform (A) indicates the change with time of the first welding current Iw1, the waveform (B) indicates the change with time of the first welding voltage detection signal Vd1, the waveform (C) indicates the change with time of the neck detection signal Nd, the waveform (D) indicates the change with time of the drive signal Dr, the waveform (E) indicates the change with time of the delay signal Tds, the waveform (F) indicates the change with time of the current control signal Icr, the waveform (G) indicates the change with time of the second welding current Iw2, the waveform (H) indicates the change with time of the current flow determination signal Cd. FIG. 3 corresponds to FIG. 5, and the second welding current Iw2 indicated as the waveform (G) is 0 A. Because of this, a neck detection failure does not occur. Explanation is given below with reference to FIG. 5.

In this example, since the second welding current Iw2 is 0 A as indicated by the waveform (G), the current flow determination signal Cd is kept at a low level as indicated by the waveform (H).

(1) Operation from t1 to t2:

When the first welding wire 11 comes into short-circuiting contact with the workpiece 2 at time point t1, the first welding voltage detection signal Vd1 rapidly drops to a short-circuiting voltage of several volts, as indicated by the waveform (B). When it is determined that the first welding voltage detection signal Vd1 has dropped below the short-circuit/arc distinction value Vta, the delay signal Tds changes from a low level to a high level, as indicated by the waveform (E). In response to this, the current control signal Icr drops at time point t1 from a predetermined high-level current setting value to a predetermined low-level initial current value, as indicated by the waveform (F). The current control signal Icr is maintained at the initial current value in the initial period between time point t1 and the t11, then increases with a predetermined gradient during the period between the t11 and the t12 and is maintained at a predetermined peak value during the period between time point t12 and time point t2. Since constant current control is performed during the short-circuiting period as noted above, the first welding current Iw1 is controlled to a value determined by the current control signal Icr. Thus, as indicated by the waveform (A), the first welding current Iw1 drops rapidly at time point t1 from the welding current during the previous arc period, is maintained at the initial current value during the initial period between time point t1 and time point t11, increases with a predetermined gradient in the period between time point t11 and time point t12 and is then maintained at the peak value during the period between time point t12 and time point t2. As indicated by the waveform (C), the neck detection signal Nd is held at a high level during the period between time point t2 and time point t3 (as described below) and at a low level during other periods. As indicated by the waveform (D), the drive signal Dr is held at a low level during the period between time point t2 and the time 21 (as described later) and at a high level during other periods. Thus, before time point t2, the drive signal Dr is held at a high level to turn on the transistor TR (FIG. 2), so that the current reducing resistor R is short-circuited or by-passed to supply welding power in normal state.

As indicated by the waveform (B), the first welding voltage detection signal Vd1 starts to increase at around time point t12 when the first welding current Iw1 reaches the peak value. This is because a neck grows gradually in the molten wire portion. From time point t12, the growth of the neck is continuously monitored. While the growing neck is monitored, the first welding current Iw1 is substantially maintained at the peak value as indicated by the waveform (A) and the second welding current Iw2 is 0 A as indicated by the waveform (G). Since $L \cdot dIg/dt = L \cdot (dIw1/dt + dIw2/dt) \approx 0$ in Equation (1), the voltage generated by the inductance L of the common current path is substantially zero. Therefore, the first welding voltage Vw1 can be precisely detected based on the first welding voltage detection signal Vd1. As a result, from time point t12, the first welding voltage detection signal Vd1 gradually increases in accordance with the growth of the neck, as indicated by the waveform (B).

(2) Operation from t2 to t3:

When the first welding voltage detection signal Vd1 increases rapidly and the voltage increase ΔV from the voltage in the initial period reaches a predetermined neck detection value Vtn at time point t2 as indicated by the waveform (B), it is determined that the neck in the molten wire portion has grown to a predetermined detection point. When the growth of the neck is detected in this way, the neck detection signal Nd changes to a high level, as indicated by the waveform (C). In response to this, the drive signal Dr changes to a low level, as indicated by the waveform (D). Thus, the transistor TR (see FIG. 2) is turned off, so that the current reducing resistor R interposed in the current path becomes effective. At the same time, the current control signal Icr drops to the low-level current setting signal Ilr, as indicated by the waveform (F). Thus, the first welding current Iw1 rapidly reduces from the peak value to the low-level current value I, as indicated by the waveform (A). When the first welding current Iw1 drops to the low-level current value Il at time point t21, the drive signal Dr returns to a high level, as indicated by the waveform (D). As a result, the transistor TR (see FIG. 2) turns on, so that the current reducing resistor R is short-circuited. Since the current control signal Icr is maintained at the low-level current setting signal Ilr, the first welding current Iw1 is maintained at the low-level current value Il until an arc is formed at time point t3, as indicated by the waveform (A). Thus, the transistor TR is turned off only during the period between time point t2 (at which the neck is detected) and time point t21 (at which the first welding current Iw1 drops to the low-level current value Il). As indicated by the waveform (B), the first welding voltage detection signal Vd1 continues to drop from time point t2 as the first welding current Iw1 drops, and then increases rapidly.

(3) Operation t3 to t4:

When a first arc 31 is formed at time point t3, the first welding voltage detection signal Vd1 exceeds the short-circuit/arc distinction value Vta, as indicated by the waveform (B). In response to this, the current control signal Icr increases from the value of the low-level current setting signal Ilr with a predetermined gradient, as indicated by the waveform (F). After reaching the high-level current setting value, the current control signal Icr is maintained at that value. As indicated by the waveform (E), the delay signal Tds is maintained at a high level from time point t3 when the arc is generated until time point t4 when the delay period Td ends. Since the welding power supply is subjected to constant current control until time point t4, the first welding current Iw1 increases from time point t3 with a predetermined gradient, as indicated by the waveform (A). After reaching a predetermined high-level current value Ih, the first welding current Iw1 is maintained at that value until time point t4. As indicated by the waveform (B), the first welding voltage detection signal Vd1 is high during the delay period Td between time point t3 and time point t4. As indicated by the waveform (C), the neck detection signal Nd is at a high level during the neck detecting time Tn between time point t2 and time point t3 and changes to a low level at time point t3 because of the formation of an arc.

(4) Operation from t4 to t5:

As indicated by the waveform (E), the delay signal Tds changes to a low level at time point t4. As a result, the first welding power supply PS1 is shifted from constant current control to constant voltage control. Thus, as indicated by the waveform (A), the first welding current Iw1 gradually drops from the high-level current value Ih until the next short-circuiting event. As indicated by the waveform (B), the first welding voltage detection signal Vd1 also drops gradually from the high-level voltage value.

According to the neck detection control described above, when a neck is detected at time point t2, the current reducing resistor interposed in the current path becomes effective to rapidly reduce the first welding current Iw1. Thus, the welding current is low when the first arc 31 is formed at time point t3, which suppresses spattering.

In the example illustrated in FIG. 3, since a welding current is not applied from the other welding power supply (second welding power supply PS2), the current flow determination signal Cd is at a low level, as indicated by the waveform (H). Thus, the decrement setting circuit DD (see FIG. 2) outputs the decrement signal Δd of a high decrement value, and the increment setting circuit DU (see FIG. 2) outputs the increment signal Δu of a high increment value. Since the first welding supply PS1 is free of a neck detection failure which would be caused by supply of a welding current from the other welding power supply to the common current path, hunting does not occur even when the gain in the automatic control is set to a large value. Thus, it is possible to realize good transient response characteristics and stability in a steady state.

In the first welding power supply PS1 illustrated in FIG. 2, if a welding current is supplied from the second welding power supply PS2, the neck detecting time Tn between time point t2 and time point t3 in FIG. 3 fluctuates greatly from zero to a considerably long duration. This happens because of a neck detection failure due to the welding current application from the second welding power supply PS2 to the common current path. When a welding current is supplied from the second welding power supply PS2 in this way, the current flow determination signal Cd is at a high level, unlike the example illustrated in FIG. 3. In this case, the decrement setting circuit DD (see FIG. 2) outputs the decrement signal Δd of a low decrement value, and the increment setting circuit DU (see FIG. 2) outputs the increment signal Δu of a low increment value. In this way, the gain in the automatic control is set to a smaller value, so that hunting that would be caused by a neck detection failure can be prevented. In this case, the transient response characteristics are slightly deteriorated, but good stability in a steady state is achieved.

Under the conditions where a neck detection failure due to supply of a welding current from the second welding power supply PS2 can occur a lot of times, the automatic control may be inhibited by setting the gain to zero. This is because when automatic control is performed in such a situation, welding becomes very unstable and a welding failure can occur. When automatic control is inhibited, the value of the neck detection value signal Vtn may deviate from a proper value. However, also in this case, a welding failure does not occur, although spatter generation increases as compared with the case where the neck detection reference signal has a proper value.

In the foregoing embodiment, supply of a welding current from the second welding power supply PS2 is checked by detecting the summed welding current Ig. In robot welding, alternatively, the current flow determination signal Cd may be produced by an operation program. Specifically, for a welding period in which a welding current is supplied from the second welding power supply PS2, a current flow determination signal Cd of a high level may be inputted from a robot controller (not shown) to the first welding power supply PS1 according to an operation program. For another welding period in which a welding current is supplied from the second welding power supply PS2, a current flow determination signal Cd of a low level is inputted. Further, when a welding current from the second welding power supply PS2 is supplied to only a section of the welding area of a workpiece, the gain in the automatic control may be set to a low value with respect to all sections of the welding area. In this case, the welding operation can be performed more stably when the gain in the automatic control is low with respect to all sections than when the gain goes up and down with respect to different sections of the welding area.

In another embodiment, the neck detecting time Tn is measured for storage of the measurement at each time of short-circuiting. Then, a predetermined number of latest measurements are compared with a predetermined lower limit and a predetermined upper limit. When the number of measurements smaller than the lower limit exceeds a predetermined number, the neck detection value Vtn is reduced by a predetermined value. When the number of the measurement values larger than the upper limit exceeds a predetermined number, the neck detection value Vtn is increased by a predetermined value. Such process may be performed at each time of short-circuiting. The gain in the automatic control may be changed by switching each of the decrement and the increment between a larger value and a smaller value, in accordance with the determination on whether or not a welding current is supplied from another power supply.

Alternatively, the automatic control may be performed as follows. The neck detecting time Tn is measured at each time of short-circuiting, and an amplification value of the error between the measured neck detecting time Tn and a predetermined target time is computed. The neck detection value Vtn is feedback-controlled based on the error amplification value. The gain in the automatic control may be changed by switching the amplification factor of the error amplification between a larger value and a smaller value, in accordance with the determination on whether or not a welding current is supplied from another power supply.

In the foregoing embodiment, the gain in the automatic control is set to a lower value when a welding current is supplied from another welding power supply than when a welding current is not supplied from another welding power supply. Namely, the gain is made low in a situation in which a neck detection failure is likely to occur due to supply of a welding current application from another welding power supply to the common current path. Thus, hunting which may be caused by a neck detection failure can be prevented. According to this embodiment, the neck detection value is converged to a proper value even when automatic control of neck detection value is operated with a welding current supplied from another welding power supply.

What is claimed is:

1. A method of controlling neck detection for a welding power supply as a control target, the method comprising:
   using the control target welding power supply and another welding power supply for performing arc welding concurrently at a plurality of locations of a common workpiece, the control target welding power supply providing a first welding current to a welder including a welding wire;
   detecting a neck in a molten portion of the welding wire which is brought into short-circuiting contact with the common workpiece based on a predetermined neck detection value of a welding voltage applied by the control target welding power supply;
   reducing the first welding current for forming an arc;
   automatically adjusting the neck detection value based on a neck detecting time which is a period from the detection of the neck to the formation of the arc;
   wherein the adjusting of the neck detection value comprises adjusting the neck detection value with a smaller gain with said another welding power supply supplying a second welding current to the common workpiece, and the adjusting of the neck detection value comprises adjusting the neck detection value with a larger gain that is larger than the smaller gain with said another welding power supply supplying no welding current to the common workpiece.

2. The method according to claim 1, wherein the smaller gain comprises zero to prohibit the automatic adjustment of the neck detection value.

3. The method according to claim 1, comprising applying the second welding current only with respect to a part of an entire welding area of the common workpiece, while the smaller gain is adopted for the entire welding area of the common workpiece.

4. A welding power supply system comprising:
   a first power supply and a second power supply for performing arc welding concurrently at a plurality of locations of a common workpiece, the first power supply and the second power supply providing a first welding current and a second welding current, respectively, to the common workpiece;
   a neck detection circuit that detects a neck in a molten portion of a welding wire to which the first welding current is supplied, the welding wire being brought into short-circuiting contact with the common workpiece, the detecting of the neck being based on a predetermined neck detection value of a welding voltage applied by the first power supply;
   a current reduction circuit that reduces the first welding current for forming an arc;
   a neck detection value adjuster circuit that automatically adjusts the neck detection value based on a neck detecting time which is a period from the detection of the neck to the formation of the arc;
   wherein the neck detection value adjuster circuit also adjusts the neck detection value with a smaller gain with the second welding current supplied to the common workpiece, and the neck detection value adjuster circuit adjusts the neck detection value with a larger gain that is larger than the smaller gain with the second power supply supplying no welding current to the common workpiece.

5. The system according to claim 4, further comprising a second welding current determination circuit that determines whether the second welding current is supplied to the common workpiece.

6. The system according to claim 5, wherein the second welding current determination circuit comprises:
- a welding current sum detection circuit that detects a sum of the first welding current and the second welding current, and
- a current flow determination circuit that calculates the second welding current based on the sum and the first welding current.

\* \* \* \* \*